July 12, 1966   T. D. WHEELOCK ET AL   3,260,035
METHOD FOR RECOVERING SULFUR DIOXIDE FROM A GAS STREAM
Filed April 29, 1963   4 Sheets-Sheet 1

INVENTORS:
Thomas D. Wheelock
David R. Boylan
BY Dawson, Tilton, Fallon
Lungmus & Alexander
ATTORNEYS.

July 12, 1966  T. D. WHEELOCK ET AL  3,260,035
METHOD FOR RECOVERING SULFUR DIOXIDE FROM A GAS STREAM
Filed April 29, 1963  4 Sheets-Sheet 2

INVENTORS:
Thomas D. Wheelock
David R. Boylan

Dawson, Tilton, Fallon
Lungmus & Alexander
BY  ATTORNEYS.

INVENTORS:
Thomas D. Wheelock
David R. Boylan

Inventors
Thomas D. Wheelock
David R. Boylan
Dawson, Tilton, Fallon
Lungmus & Alexander
Attorneys

United States Patent Office 3,260,035
Patented July 12, 1966

3,260,035
METHOD FOR RECOVERING SULFUR DIOXIDE FROM A GAS STREAM
Thomas D. Wheelock and David R. Boylan, Ames, Iowa, assignors to Iowa State University Research Foundation, Inc., Ames, Iowa, a corporation of Iowa
Filed Apr. 29, 1963, Ser. No. 276,559
2 Claims. (Cl. 55—73)

This application is a continuation-in-part of copending application Serial No. 838,368, filed Sept. 4, 1959, now Patent No. 3,087,790, issued April 30, 1963.

This invention relates to the reductive decomposition of calcium sulfate, and more particularly to a procedure by which calcium sulfate is reduced to produce lime and sulfur in a readily convertible form, i.e., sulfur dioxide.

It is a general object of this invention to provide a novel procedure for the reductive decomposition of calcium sulfate, such as the naturally occurring gypsum, anhydrite or by-product gypsum—such as would be produced in the wet process production of phosphoric acid. Another object is to provide a procedure for decomposing calcium sulfate wherein the products of the reaction are provided in a commercially acceptable form. Still another object is to provide a procedure for the decomposition of calcium sulfate which is characterized by minimal formation of calcium sulfide. Yet another object is to provide the optimum conditions for a calcium sulfate decomposition when using reducing gas mixtures. Other objects and advantages of this invention can be seen as this specification proceeds.

The invention will be explained in conjunction with the accompanying drawings in which.

Figure 1:
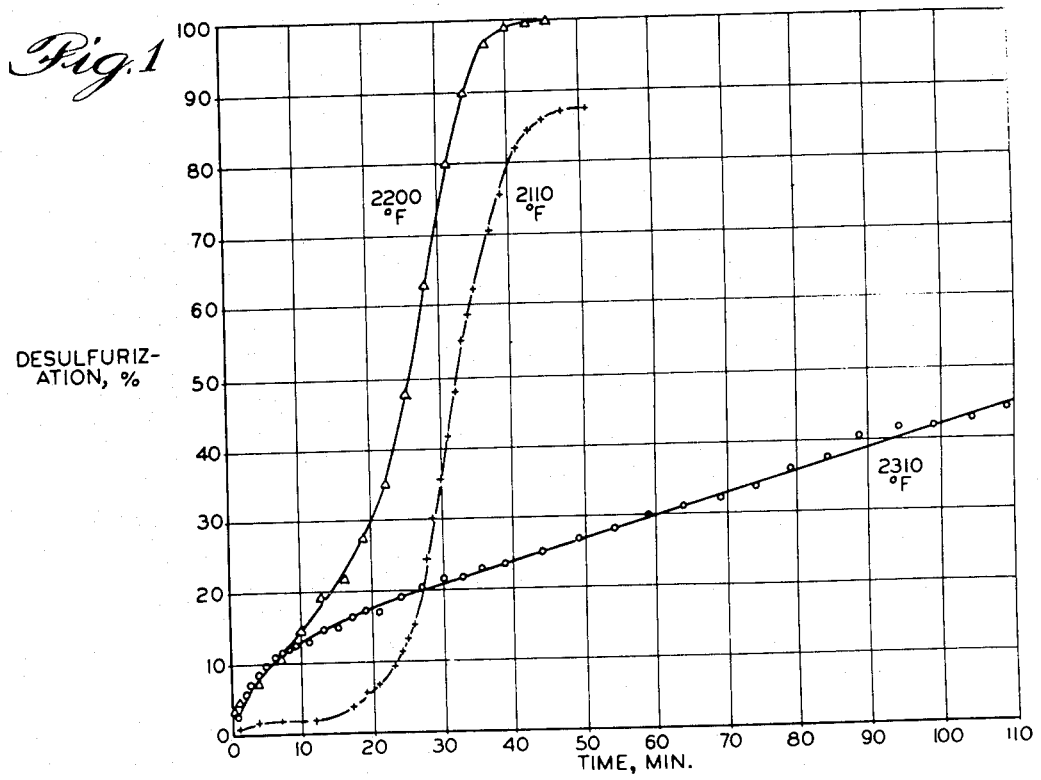
FIG. 1 is a chart showing the precent desulfurization of calcium sulfate as a function of time and how this occurs at different temperatures.

Although Frasch sulfur is now the leading raw material for the production of sulfuric acid in this country, it is possible that brimstone may be replaced by gypsum and anhydrite. Reserves of these naturally-occurring calcium sulfate minerals are unlimited, but reserves of Frasch sulfur appear to be inadequate.

Even today, sulfuric acid is being produced from anhydrite in several European plants. These plants are based on a process in which anhydrite, coke and shale are heated to a sintering temperature in a large rotary kiln. Sulfur is recovered as sulfur dioxide which is subsequently converted into sulfuric acid, the clinker being used for Portland cement.

The invention here contemplates a simpler process in which an alkaline earth sulfate such as calcium sulfate reacts with a reducing agent such as carbon monoxide at an elevated temperature to produce sulfur dioxide and an alkaline earth oxide such as lime. The decomposition is illustrated by the following reaction:

$$CaSO_4 + CO = SO_2 + CO_2 + CaO \qquad (1)$$

By controlling the above reaction, particularly relative to the temperature and the composition of the gas phase, we have found it possible to produce a high quality lime by-product which makes the procedure more flexible in application than the present European process. It appears, however, that the possibility of utilizing the reductive decomposition seen in Reaction 1 has been disregarded. We attribute this to the fact that the production of the desired end products has been frustrated through the ease with which calcium sulfate is reduced to calcium sulfide by the following reaction:

$$CaSO_4 + 4CO = CaS + 4CO_2 \qquad (2)$$

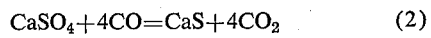

Thermodynamic investigation shows that the principal reaction (Reaction 1) is endothermic and is favored by higher temperatures. Formation of calcium sulfide (Reaction 2) is exothermic and is favored by lower temperatures. Above 2100° F. and under equilibrium conditions, calcium sulfide cannot exist in the presence of calcium sulfate because of the following reaction:

$$3CaSO_4 + CaS = 4SO_2 + 4CaO \qquad (3)$$

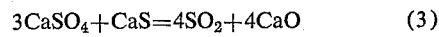

For the reactions of interest, calculated values of the heats of reactions and of the logarithms of the equilibrium constants are presented in Table I. To show that a reducing agent is needed for the decomposition of calcium sulfate, equilibrium constants for Reaction 4 have also been included, Reaction 4 being:

$$CaO_4 = CaO + SO_2 + \tfrac{1}{2}O_2 \qquad (4)$$

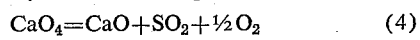

Table I.—Equilibrium constants and heats of reaction

| Reaction | Log$_{10}$ K. | | | Heat of Reaction, g.cal./g.mole | | |
|---|---|---|---|---|---|---|
| | 1,200° K. | 1,400° K. | 1,600° K. | 1,200° K. | 1,400° K. | 1,600° K. |
| $CaSO_4 + CO = CaO + SO_2 + CO_2$ | 0.31 | 1.48 | 2.28 | 46,300 | 43,400 | 39,500 |
| $CaSO_4 + 4CO = CaS + 4CO_2$ | 7.92 | 6.69 | 5.66 | −46,500 | −48,400 | −51,000 |
| $3CaSO_4 + CaS = 4CaO + 4SO_2$ | −6.68 | −0.77 | 3.44 | 231,700 | 222,200 | 208,900 |
| $CaSO_4 = CaO + SO_2 + \tfrac{1}{2}O_2$ | −7.42 | −4.51 | −2.38 | 113,600 | 110,600 | 106,200 |

We have established that the calcium sulfate in the form of gypsum could be quantitatively decomposed by passing a stream of nitrogen over the gypsum heated to temperatures in the vicinity of 2200° F. However, adding as little as 1% of the gaseous decomposition products, sulfur dioxide and oxygen, to the nitrogen has prevented the decomposition. Thus, the decomposition of calcium sulfate without the use of a reducing agent was economically unfeasible. We found that calcium sulfate would be decomposed in the presence of as much as 7% sulfur dioxide, provided several percent of a reducing gas moiety such as carbon monoxide was also present in the gas mixture (Reaction 1). Generally, we have found that the higher the concentration of the reducing gas, the better the production of sulfur dioxide. However, the utility of this information is sharply limited in that increasing amounts of the reducing gas moiety is productive of increased amounts of calcium sulfide. Even where the reaction is carried out in the preferred temperature range of 2150–2250° F., appreciable calcium sulfide is developed. Below 2150° F. the desirable interaction between the calcium sulfate and calcium sulfide (Reaction 3) is not favored, while above 2250° F., the calcium sulfate tends to fuse somewhat and develop a somewhat glassy surface on the particles. This is believed to seal the pores in the solid particles and prevent passage of the gaseous reactants and products of reaction, thereby limiting production. The development of calcium sulfide in the indicated temperature range is attributable to the fact that equilibrium conditions ordinarily do not exist and further that there are a number of undesirable side reactions involving the production of calcium sulfide operative in a system involving the various reactants.

We have found that the undesirable presence of calcium sulfide can be prevented through the fortification of the reducing gas moiety with a moiety effective to supress the residue sulfide formation. In the example following, this suppressor gas moiety is carbon dioxide and is present in substantial quantities in the gas mixture.

EXAMPLE I

The influence of providing carbon dioxide as part of the reaction gas mixture was investigated by providing a gas containing 3% carbon monoxide, 20% carbon dioxide and 5% sulfur dioxide, the remainder being nitrogen. This was passed through a gypsum bed having a depth of one inch, the particles size being −7 +8 mesh and the mass velocity of the gas being 0.20 lb./sec.-sq. ft. The percent desulfurization at the temperatures of 2100° F., 2200° F., and 2310° F. is seen in FIG. 1 and at the two higher temperatures no appreciable calcium or other alkaline earth sulfide was produced. The gypsum had the composition set forth in Table II.

*Table II*

| Constituent: | Weight percent |
|---|---|
| $H_2O$ (combined) | 19.6 |
| CaO | 30.9 |
| MgO | 0.1 |
| $SO_3$ | 45.1 |
| $CO_2$ | 0.7 |
| $R_2O_3$ | 0 |
| $SiO_2$ | 3.3 |
| NaCl | 0.3 |
| Total | 100.0 |

In this example as well as that following, the reactor was charged with a one inch thick bed of gypsum and suspended inside of a preheated furnace. As the reactor temperature rose, a mixture of sulfur dioxide and air was passed through it to prevent the gypsum from decomposing. As operating temperature was approached, nitrogen and carbon dioxide were added to the mixture. When the reactor temperature had levelled out, the flow of air was stopped and the flow of carbon monoxide was started. This marked the beginning of a run. At regular intervals of 1–10 minutes depending on the rate of decomposition, the reactor weight and other important data were noted. The run was continued until the reactor reached a constant weight. The reactor was slowly withdrawn from the furnace while nitrogen and a small amount of carbon monoxide were passed through it. The solids from the reactor were analyzed for sulfate, sulfide, and calcium. The sulfate was determined gravimetrically according to the method outlined by the American Society for Testing Materials, ASTM Standards Including Tentatives, 1962, part 3; 265–77. Sulfide was determined iodometrically. The sample was treated with an excess of a standard solution of potassium iodate and potassium iodide. Excess of hydrochloric acid was then added and the sample container was closed immediately. After the reaction had subsided, the excess iodine liberated was titrated with standard sodium thiosulfate solution. Calcium was determined by the versenate titration method developed for determining total hardness in water and described by Diehl, Goetz, and Hach, Journal of the American Water Works Association, 42, 40–48 (1950).

The total desulfurization or conversion of calcium sulfate to calcium oxide was calculated from the composition of the residual solids. By assuming that the instantaneous conversion was proportional to the weight lost by the gypsum charge, it was possible to plot the desulfurization curves, such as those appearing in FIG. 1.

The data presented in FIG. 1 also show the effect of temperature on the desulfurization rate. At 2210° F., the gypsum passed through the initial induction period where little or no decomposition occurred. The reaction rate soon increased, and a relatively constant but rapid desulfurization rate was established. At the end, the gypsum was 87% desulfurized and the solids contained 11% calcium sulfide. Increasing the temperature to 2200° F. had the effect of increasing the initial desulfurization rate, but the maximum rate was unaffected. The total desulfurization was increased to almost 100% and no calcium sulfide was found in the solids. When the temperature was raised to 2310° F. the initial rate was the same as for 2200° F. but the subsequent rate of the decomposition was much lower than for 2200° F.

The effect of changing the quantity of carbon dioxide in the reaction gas mixture was studied in the above procedure and results set forth in Example II below.

EXAMPLE II

In the same apparatus employed for the results shown in FIG. 1, various combinations of carbon monoxide, carbon dioxide and nitrogen were passed through a gypsum bed again with a mass velocity of 0.20 lb./sec.-sq. ft. The temperature employed was about the optimum temperature as determined in Example I. Table III shows the effects of carbon monoxide and carbon dioxide ratios on the percent calcium sulfide produced.

*Table III*

| Gas Composition, CO | Mole Percent [a] $CO_2$ | Temp.,[b] ° F. | CaS, Weight Percent |
|---|---|---|---|
| 1.0 | 0 | 2,250 | 0.1 |
| 1.0 | 5.0 | 2,210 | 0 |
| 1.0 | 5.0 | 2,220 | 1.2 |
| 2.0 | 0 | 2,250 | 14.7 |
| 1.9 | 0 | 2,230 | 17.0 |
| 2.0 | 5.0 | 2,220 | 0 |
| 3.9 | 0 | 2,210 | 27.2 |
| 4.0 | 0 | 2,220 | 20.8 |
| 4.1 | 5.1 | 2,190 | 0 |

[a] Remainder nitrogen.
[b] Mean outlet temperature during maximum desulfurization rate period.

From the foregoing table, it can be seen that when the gas fed to the reactor contained more than 1% carbon monoxide and no carbon dioxide appreciable amounts of calcium sulfide were produced. The percent calcium sulfide was found to increase with the carbon monoxide concentration. However, adding as little as 5% carbon dioxide reduced the amount of calcium sulfide to insignificance. In general, it can be said that when sulfur dioxid was excluded from the gas to the reactor, the percent calcium sulfide was found to increase with carbon monoxide concentration. When sulfur dioxide was absent, the presence of as little as 5% carbon dioxide prevented the occurrence of calcium sulfide provided the carbon monoxide concentration did not exceed 4% and the temperature was at least 2200° F.

To approximate commercial production conditions, investigations of the effect of the presence of sulfur dioxide were made. This is seen in Example III below.

EXAMPLE III

Figure 2:
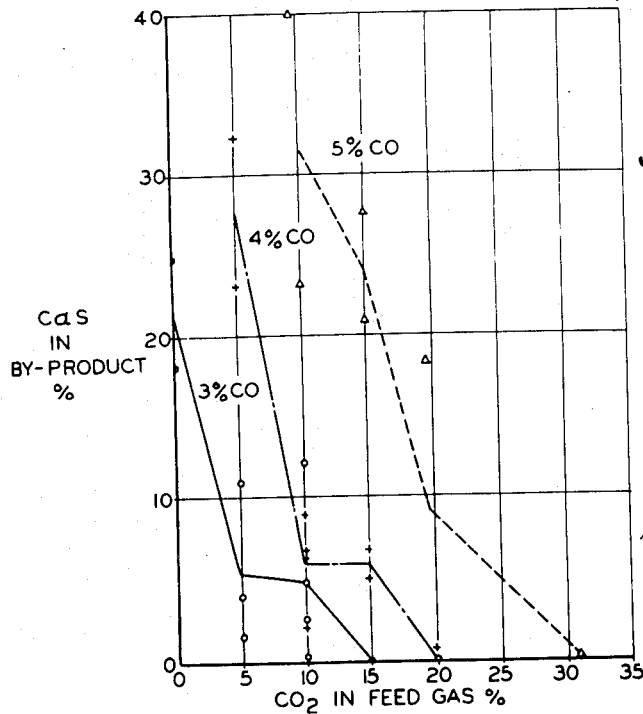
FIG. 2 is a chart showing calcium sulfide in the by-product as a function of carbon dioxide in the feed-gas.

In the reactor described hereinbefore and using the same-sized gypsum and mass velocity, a reaction gas containing 5% sulfur dioxide and varying amounts of carbon dioxide, carbon monoxide and nitrogen was employed. The temperature was generally in the range of 2140–2250° F. The results of this series of tests are presented in FIG. 2, where can be seen that the calcium sulfide in the solid by-product could be reduced to virtual insignificance (i.e., less than one percent) through the presence of a suitable quantity of carbon dioxide. It is to be noted that calcium sulfide increases with carbon monoxide concentration for a fixed carbon dioxide concentration. As can be seen from FIG. 2, an increase in the level of carbon monoxide required a proportionate increase in the level of carbon dioxide to accomplish the suppression of calcium sulfide development. The data presented in FIG. 2 yield the following correlation between percent of carbon monoxide and carbon dioxide for minimal calcium sulfide production.

| Percent CO | Percent $CO_2$ |
|---|---|
| 3 | 15 |
| 4 | 20 |
| 5 | 31 |

When a substantial quantity of sulfur dioxide is present, it appears that the carbon dioxide should be present in a quantity about five to six times that of the carbon monoxide.

Figure 3:
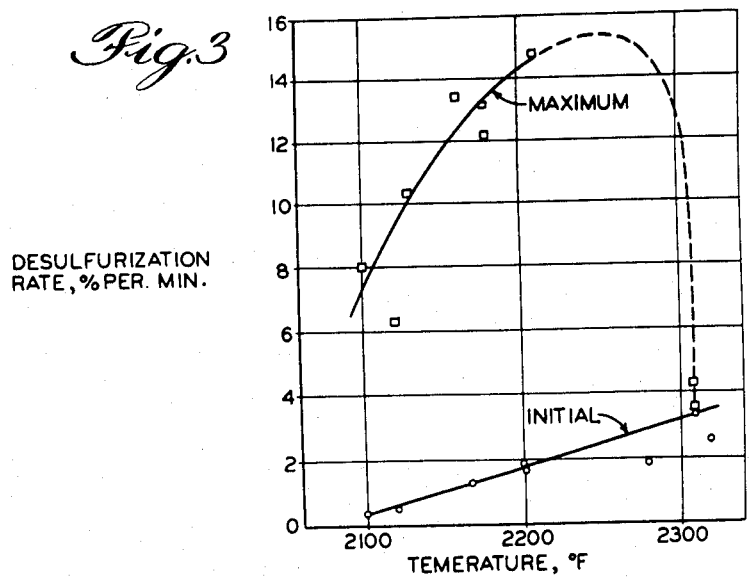
FIG. 3 is a chart showing the effect of temperature on the desulfurization rate.

The slope of curves such as seen in FIG. 1 is the desulfurization rate and this is extremely significant in any commercial operation. A plot of the slopes of the curves such as are seen in FIG. 1 can be found in FIG. 3. The data on which FIG. 3 is based were derived from runs in which the gas composition included 4% carbon monoxide, 10% carbon dioxide, 5% sulfur dioxide, and 81% nitrogen. Other than that, the conditions were the same as those followed providing the data employed for developing FIG. 1. In FIG. 3, it can be seen that the initial desulfurization rate was measurable even at 2100° F. and that it increased throughout the temperature range. Between 2100 and 2200° F., the maximum rate almost doubled, reaching a peak value around 2250° F. The maximum rate fell at higher temperature so that at 2310° F. the rate was less than at 2100° F. and not much higher than the initial desulfurization rate.

When sulfur dioxide was excluded from the gas fed, the maximum desulfurization rate reached the peak value at about 2150° F. with 4% carbon monoxide and at about 2250° F. with 2% carbon monoxide. The variation in the rate with temperature was much greater with 4% carbon monoxide than for 2%. Again an increase in temperature from 2100 to 2200° F. caused a sharp reduction in the calcium sulfide produced.

Figure 4:
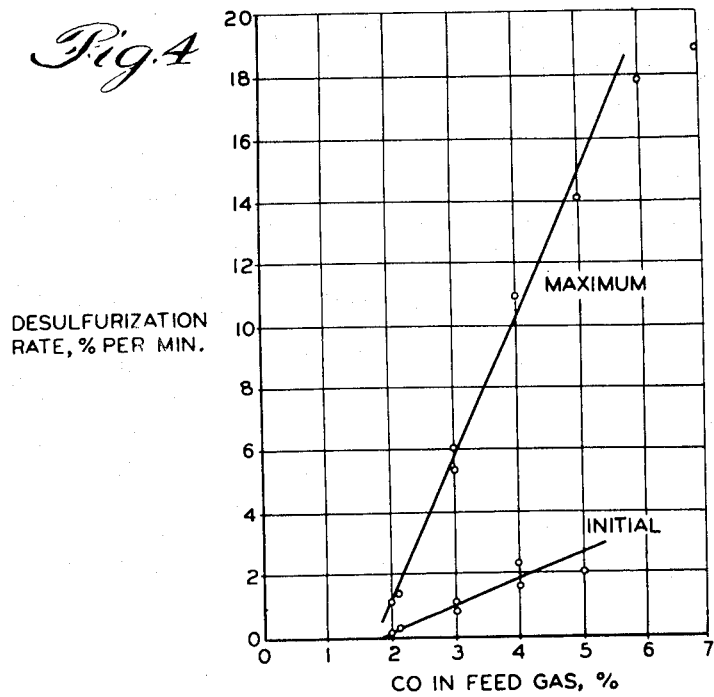
FIG. 4 is a chart showing the desulfurization rate as a function of the carbon monoxide in the feed-gas.
Figure 5:
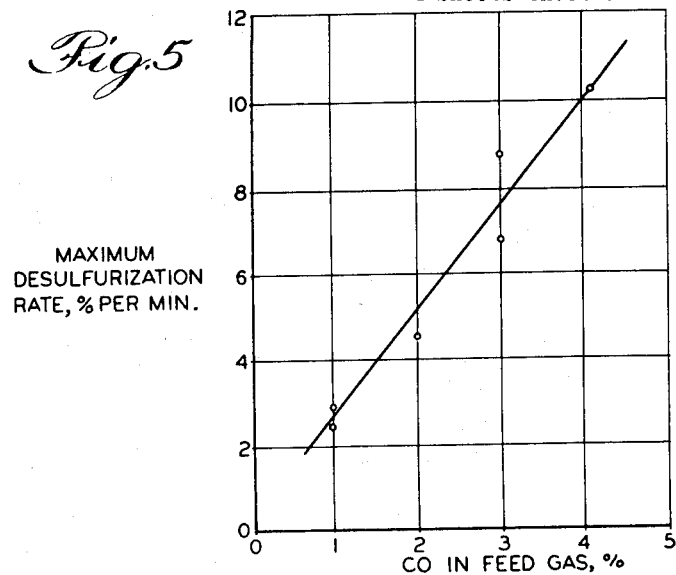
FIG. 5 is a chart showing the maximum desulfurization rate as a function of carbon monoxide in the feed-gas.

The desulfurization rate appears to be a linear function of the carbon monoxide concentration as is illustrated by FIGS. 4 and 5. In FIG. 4, carbon dioxide and sulfur dioxide were included in the gas fed, the gas composition including 20% carbon dioxide and 5% sulfur dioxide, the percentage carbon monoxide being indicated in FIG. 4 with the remainder again being nitrogen. In FIG. 4, the desulfurization rate curves were derived from the usual S-shaped desulfurization curves, such as are seen in FIG. 1. Both the initial rate and the maximum rate appear to be first order with respect to the carbon monoxide concentration, but the reaction velocity constant is much smaller for the initial rate than for the maximum rate portions of the desulfurization curve. This would seem to indicate a change in the reaction mechanism during the batchwise desulfurization of calcium sulfate. It is of interest to note that both the initial and maximum rates converge on zero at 1.8% of carbon monoxide. At the higher carbon monoxide concentration, the maximum rate did not increase proportionally, perhaps because some calcium sulfide was being produced.

In FIG. 5, sulfur dioxide was excluded, the gas fed contained 5% carbon dioxide. This had the effect of increasing the maximum desulfurization rate for small concentrations of carbon monoxide, but the slope of the linear relationship between the rate and the concentration was reduced, so that for 4% carbon monoxide, the maximum rates were about the same for both cases. In another case where both carbon dioxide and sulfur dioxide were excluded, the relationship was about the same as that shown in FIG. 5.

Figure 6:
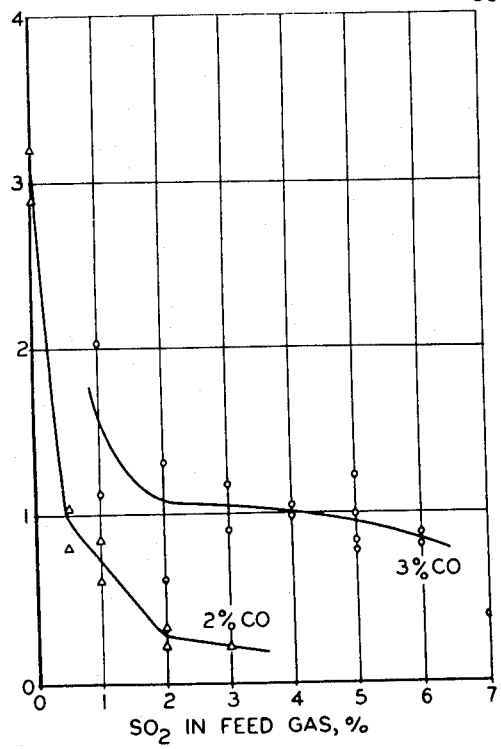
FIG. 6 is a chart showing the initial desulfurization rate as a function of the sulfur dioxide in the feed-gas.

Concerning FIG. 6, it appears that for small carbon monoxide concentrations, sulfur dioxide seems to retard the initial desulfurization rate. The desulfurization rate was influenced only to a small degree by carbon dioxide concentration, at least for concentrations up to 30%.

For the conditions which produce "S" shaped desulfurization curves, the gas mass velocity had opposite effects on the initial and maximum desulfurization rates. When the mass velocity increased from 0.1 to 0.3 lb./sec.-sq. ft., the initial rate decreased and the maximum rate increased. The increase in the maximum rate can be attributed to an increase in the mass transfer rate in the gas phase or to an increase in the average carbon monoxide concentration. In other words, at the higher mass velocities there would have been a smaller change in the carbon monoxide concentration across the gypsum bed. It is estimated that the increase of the average carbon monoxide concentration could have accounted for over 70% of the increase in maximum rate with mass velocity. Under these conditions transport in the gas phase did not appear to be the dominant rate controlling mechanism.

The desulfurization rate was found increased to a greater extent with mass velocity in the range of 0.1 to 0.3 lb./sec.-sq. ft. where carbon dioxide and sulfur dioxide were excluded and 2% carbon monoxide was fed. The increase in the average carbon monoxide concentration with increasing mass velocity would not account for the increase in the desulfurization rate, hence the mass transfer rate could have been rate controlling.

The effect of particle size affects the maximum desulfurization rate but has little effect on the initial desulfurization rate. The maximum desulfurization rate was found to decrease rapidly as the particle size increased. In determining the effect of particle size on the desulfurization rate, a mass velocity of 0.20 lb./sec.-sq. ft. was employed with the temperature in the range 2160–2220° F., the gas composition being 3% carbon monoxide, 20% carbon dioxide, 5% sulfur dioxide, with the remainder nitrogen. Under these conditions, the initial desulfurization rates were substantially constant at 1% per minute for particles of a size ranging from .05–.20 inch. The rate decreased from about 10% per minute for the maximum desulfurization rate with .05 inch particles to about 4% per minute with 0.20 inch particles.

The particle size can be important in determining the economics of a commercial installation, inasmuch as with smaller particles there is additional cost in grinding. Also, with exceedingly small particles and fluidized bed reactors, lower gas velocities are required so that a larger contactor is needed.

From the foregoing discussion it can be seen that the composition of the gas phase in the reaction zone is important to the successful operation of the process. For best results in the reaction zone the concentration of carbon monoxide should lie in the range of about 1–7% and the concentration of carbon dioxide should be about five or more times the concentration of carbon monoxide. Since carbon monoxide is being consumed and carbon dioxide is being generated by the reaction, it follows that the gas fed may contain a larger concentration of carbon monoxide and a smaller concentration of carbon dioxide than is optimum for the reaction zone. This is especially true of the type of reactor where the gas phase is well mixed so that the incoming gas is mixed and diluted with the gas in the reactor. If a concentration gradient reactor (i.e., countercurrent flow or parallel flow reactors) is employed, the carbon monoxide concentration in the gas fed may not greatly exceed the concentration recommended for the reaction zone. However, the carbon dioxide concentration may be somewhat less providing no substantial amount of sulfur dioxide is present. In the gas entering a concentration gradient reactor, the ratio of carbon dioxide to carbon monoxide need not be as high as in the gas leaving because the sulfur dioxide concentration is very small at the gas inlet compared to the outlet.

The desired ratio of the gas moiety effective to suppress residual sulfide development to the reducing gas moiety can be developed through the incomplete combustion of reducing gas or coke. If natural gas is employed in the production of the reducing gases, some water vapor is necessarily present as a combustion product and it is believed that some benefit may be derived from the combination of water vapor and carbon dioxide. A typical natural gas burned with 75–95% of the air as required for complete combustion yields satisfactory amounts of the suppressor gas moiety and the reducing gas for the operation of the invention.

In the use of natural gas burned with insufficient air for complete combustion as a source of the reactant gas, it is important to note that hydrogen if present appears to be more likely to yield calcium sulfide than does carbon monoxide. Further, the side reactions productive of calcium sulfide increase with the concentration of the reducing gas. However, by maintaining in the reaction zone the reducing gas in the range of 1–7% of the gas mixture and providing a quantity of the suppressor gas moiety of about five or more times the quantity of reducing gas, the tendency toward residual sulfide production is minimized. The best results are obtained when the temperature of the reaction is within the range of 2150–2250° F. In this temperature range, in the gas fed to the reactor, the mole ratio of reducing gas moiety (i.e., based on carbon monoxide or hydrogen) to calcium sulfate should lie in the range of 1:1 to 2:1 and the mole ratio of sulfide suppressor moiety (carbon dioxide) to calcium sulfate should lie in the range of 1:1 to 6:1.

As mentioned hereinbefore, it is possible to reductively decompose gypsum, which is a by-product of wet process phosphoric acid. In such a case, the phosphogypsum could be available in the form of a water slurry. A typical phosphogypsum might contain about 6% silica and 80% of the gypsum might pass through a 100 mesh Tyler sieve.

Figure 7:
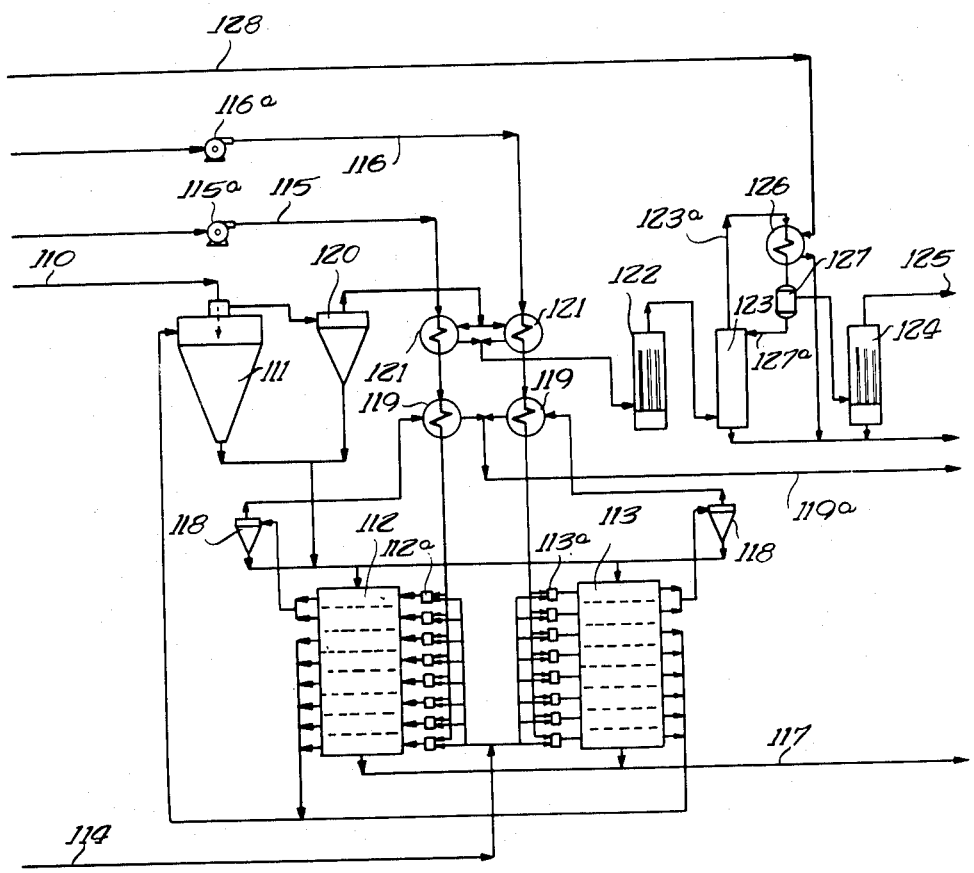
FIG. 7 is a flow sheet of apparatus which may be employed in the practice of the invention.

For the case where the invention is to be applied to the decomposition of phosphogypsum, the apparatus arrangement of FIG. 7 may be employed. There, it is to be seen that the gypsum slurry entering at 110 is directed to a spray dryer 111. The dehydrated solids are conveyed to a pair of fluidized bed reactors 112 and 113. As shown, each reactor 112 and 113 contains eight stages. The upper two stages comprise a solids preheating section, while the lower stages comprise a reaction section. In the latter section, the calcium sulfate reacts with a reducing gas moiety such as carbon monoxide and hydrogen produced by burning natural gas in burners 112a and 113a with a limited amount of air. The gas is provided through line 114, while the air for burners 112a and 113a is provided by pipe lines 115 and 116, respectively, these lines being equipped with blowers 115a and 116a. The lime produced, together with the silica initially present in the phosphogypsum, is conveyed to storage as at 117. The hot sulfurous gas is cooled and purified.

For the purpose of separating solids from gases, the reactors for the initial two stages are equipped with cyclones 118. The gas issuing from the cyclones 118 is sent to heat exchangers 119 and hence to a stack as at 119a. The solids portion of the material introduced into the cyclones 118 is recirculated to the reactors 112 and 113.

The gaseous portion from the six reaction stages of each reactor 112 and 113 is directed to the spray dryer 111 and the gaseous portion of this to a cyclone 120. The gas from cyclone 120 is directed to heat exchangers 121. The output of these heat exchangers is sent to a dust precipitator 122, a scrubber 123, and a mist precipitator 124, after which the gas is sent to a sulfuric acid plant through line 125.

The arrangement illustrated above offers several advantages. It permits feeding gas having a different composition to each stage of the reactor 112 or 113, as the case may be. Thus, in the upper two stages, an oxidizing gas can be used for preheating solids so that no calcium sulfide is formed. In the lower stages, the reducing gas moiety and the sulfide-suppressor moiety can be adjusted for each stage to give best overall results. Further, a multiplicity of stages insures more uniformity in the time individual particles of solids remain in the reactor. Still further, sulfur dioxide is removed from each stage as soon as it is liberated. In this fashion, there is a minimal tendency for side reactions to occur which might reduce sulfur dioxide to sulfur or hydrogen sulfide, which in turn might react with the lime to form calcium sulfide.

The arrangement presented also provides advantageous operation in the scrubber and condenser arrangement. After the warm gas passes through the dust precipitator 122, it still contains some dust and considerable water vapor, which must be removed. By employing the arrangement shown, in which the scrubber 123 has its gas outlet 123a connected to a condenser or indirect heat exchanger 126 and a liquid-gas separator 127, it is possible to condense the water vapor and use the resulting liquid to scrub out the dust. The heat exchanger 126 is supplied with cooling water through line 128. Some sulfur dioxide will be adsorbed in the cool condensate, but this loss is minimized in that the scrubber also acts as a stripper for the sulfur dioxide. The liquid is heated as it passes through the scrubber 123, which reduces the solubility of the sulfur dioxide so that it can be desorbed. Thus, we have provided an advantageous method for purifying a warm gas stream of suspended dust and condensable vapor without significant loss of any other components which may be soluble in the condensed vapor. For the practice of the invention in the case of natural gypsum or anhydrite, the apparatus also may be arranged as in FIG. 7. The differences in raw material properties may make minor modifications desirable. For example, it may prove more economical to feed natural gypsum or anhydrite in the form of dry solids which are of a larger particle size than the usual phosphogypsum. Under these circumstances, a spray dryer could be eliminated and fewer reactor stages might be required.

For maximizing the benefits of the present invention, it has been found desirable to control the particle size of the comminuted calcium sulfate. Speaking generally, it is preferred that the calcium sulfate rock be crushed and ground, and if necessary screened, to produce a feed or starting material wherein approximately 90% or more of the calcium sulfate particles fall within the size range of −3 mesh +20 mesh in terms of Tyler standard screen mesh sizes. In one preferred embodiment at least 75% and preferably at least 90% of the calcium sulfate falls within the size range of −4 mesh to +14 mesh. With coarser calcium sulfate feed materials, the primary reduction reaction proceeds too slowly. With finer calcium sulfate feeds, the undesired side reaction which produces calcium sulfide tends to proceed more readily, and even with the preferred temperature control, it is difficult to avoid having some calcium sulfide in the final product. The control of the mesh size of the starting material is particularly important where the carbon monoxide content of the treating gas is 3% or more. It will rarely be desirable, however, to exceed a carbon monoxide content of greater than 10% by volume, and usually the carbon monoxide content will not exceed 7 or 8%. The advantage of higher carbon monoxide concentrations, such as 3 to 7%, is that the by-product gas will contain a higher concentration of sulfur dioxide, which can then be converted to sulfuric acid.

When the method of this invention is practiced with the specified control of the particle size of the feed material, the preferred temperature approximates 2250° F. The operating temperature may vary 25 to 30° F. above or below this temperature without adverse effect, and therefore this permits good temperature control of the process. For example, the process may be operated at a temperature within the range from 2120 to 2280° F., although it is preferred to control the temperature as closely as possible to 2250° F. It will be understood, of course, that the measurement of temperatures in a process of this type where such elevated temperatures are encountered will necessarily be subject to some error. Normally, the measured temperature will not vary from the actual temperature by more than 10° F.

In the foregoing specification, reference has been made to the possible formation of the undesired calcium sulfide by the reaction of Equation 2. It is possible that this is not the only reaction which may cause the formation of calcium sulfide. There is some indication that a second calcium sulfide forming reaction is involved, and this reaction apparently is inhibited by temperatures above 2200° F., such as temperatures ranging from 2220° to 2280° F. At temperatures approximating 2250° F. apparently all sulfur dioxide forming reactions are inhibited.

This invention in one of its preferred embodiments is further illustrated by the following additional examples:

EXAMPLE IV

Gypsum ground and sized so that substantially 100% of the starting material was −7 +8 mesh (Tyler standard screen) was reacted at 2250° F. (±10° F.) with a treating gas composed of 5% CO, 30% $CO_2$, 5% $SO_2$, and the balance nitrogen for approximately 60 minutes. The treating gas was passed over the gypsum which was distributed in a thin layer. The calcium oxide product contained less than .6% calcium sulfide.

EXAMPLE V

A gypsum feed sized to −12 +14 mesh was treated as described in Example IV, using the same temperature, treating gas, and reaction time. The calcium oxide product contained less than .8% calcium sulfide.

While in the foregoing specification we have set forth a detailed description of the invention for the purpose of explanation thereof, it will be understood that those skilled in the art may make many variations in the details herein given without departing from the spirit and scope of the invention.

We claim:
1. In the preparation of sulfur dioxide, the method of removing dust and water from a warm gas stream containing sulfur dioxide, water vapor, and dust, the steps of:
 (a) scrubbing said stream contercurrently with liquid water at a temperature high enough to maintain most of said water vapor in said gas stream as vapor and removing said dust with the liquid scrub water;
 (b) condensing said water vapor in the scrubbed gas stream in a condenser to reduce the water content of said scrubbed gas stream and separating said gaseous sulfur dioxide from the condensed water to provide liquid water for said scrubbing step; and
 (c) utilizing said condensed and separated water as at least the major source of the liquid water for said scrubbing step;
whereby the dust and water content of the sulfur dioxide can be effectively reduced with a minimum loss of sulfur dioxide.

2. The method of claim 1 wherein substantially all of the liquid water employed in said scrubbing step is said condensed water, and wherein substantially all of the said water vapor in said gas stream remains uncondensed in said scrubbing step.

References Cited by the Examiner

UNITED STATES PATENTS

| | | | |
|---|---|---|---|
| 1,845,744 | 2/1932 | Fleck | 23—186 |
| 1,947,952 | 2/1934 | Nitzschke | 23—186 |
| 2,598,116 | 5/1952 | Du Bois | 55—73 |
| 3,078,640 | 2/1963 | Milton | 55—73 |

REUBEN FRIEDMAN, *Primary Examiner.*

MAURICE BRINDISI, *Examiner.*

C. N. HART, E. STERN, *Assistant Examiners.*